July 7, 1925.

Re. 16,108

E. C. NEWCOMB

INTERNAL COMBUSTION ENGINE

Original Filed June 4, 1919

2 Sheets-Sheet 1

Edward Cooley Newcomb INVENTOR

BY

H. R. Kimber ATTORNEY

July 7, 1925.

Re. 16,108

E. C. NEWCOMB

INTERNAL COMBUSTION ENGINE

Original Filed June 4, 1919

2 Sheets-Sheet 2

Edward Carey Newcomb
INVENTOR

H. S. Kimball
BY

ATTORNEY

Reissued July 7, 1925. Re. 16,108

UNITED STATES PATENT OFFICE.

EDWARD COVERLY NEWCOMB, OF NORTH SCITUATE, MASSACHUSETTS, ASSIGNOR TO THE UNITED STATES TRUST COMPANY OF NEW YORK, OF NEW YORK, N. Y., A CORPORATION OF NEW YORK, AS TRUSTEE.

INTERNAL-COMBUSTION ENGINE.

Original No. 1,453,164, dated April 24, 1923, Serial No. 301,709, filed June 4, 1919. Application for reissue filed April 18, 1925. Serial No. 24,287.

*To all whom it may concern:*

Be it known that I, EDWARD COVERLY NEWCOMB, a citizen of the United States, residing at North Scituate, county of Plymouth, and State of Massachusetts, have invented new and useful Improvements in Internal-Combustion Engines, of which the following is a specification.

My invention relates particularly to engines of the two-cycle type and the objects of my invention are to produce an internal combustion engine of the two-cycle type which shall be readily controlled throughout its entire range; to isolate partial charges of explosive mixture in close proximity to the firing mechanism; to provide means whereby the explosive mixture may expel the burnt gases without substantially commingling therewith; and to provide a clearance chamber in which the flame propagation coincides with the path taken by the mixture as it enters the compression chamber to prevent back-firing and to accomplish these results without undue sacrifice of power under full throttle operation.

Figure 3:
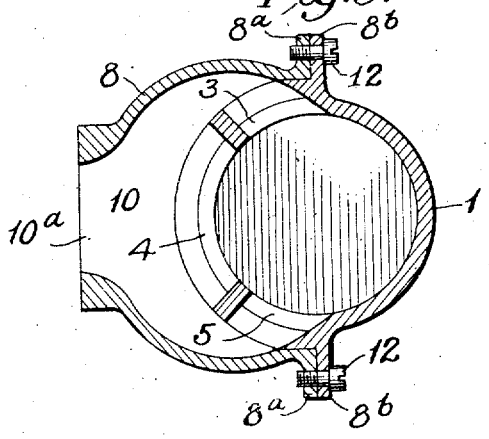
Figure 1:
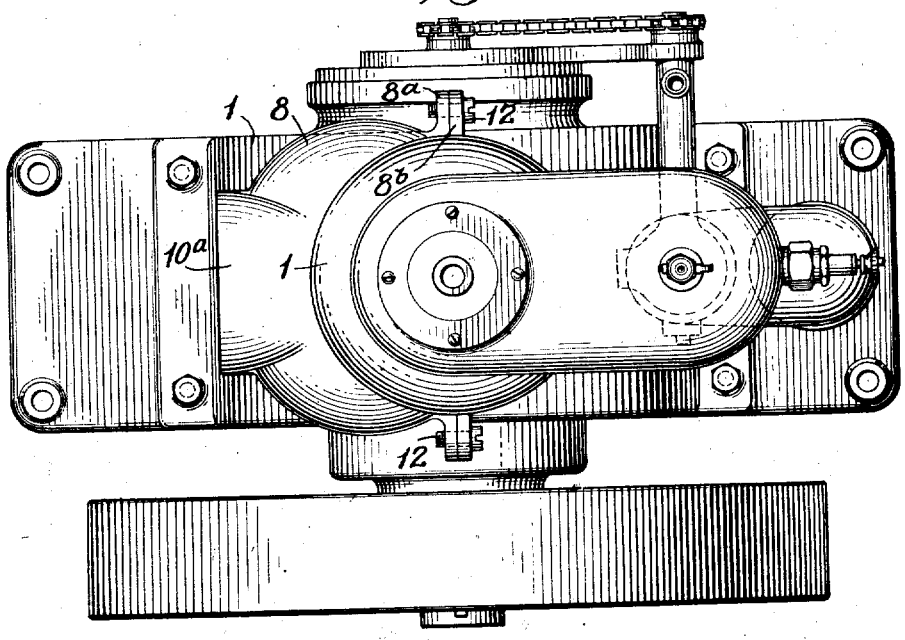
Figure 2:
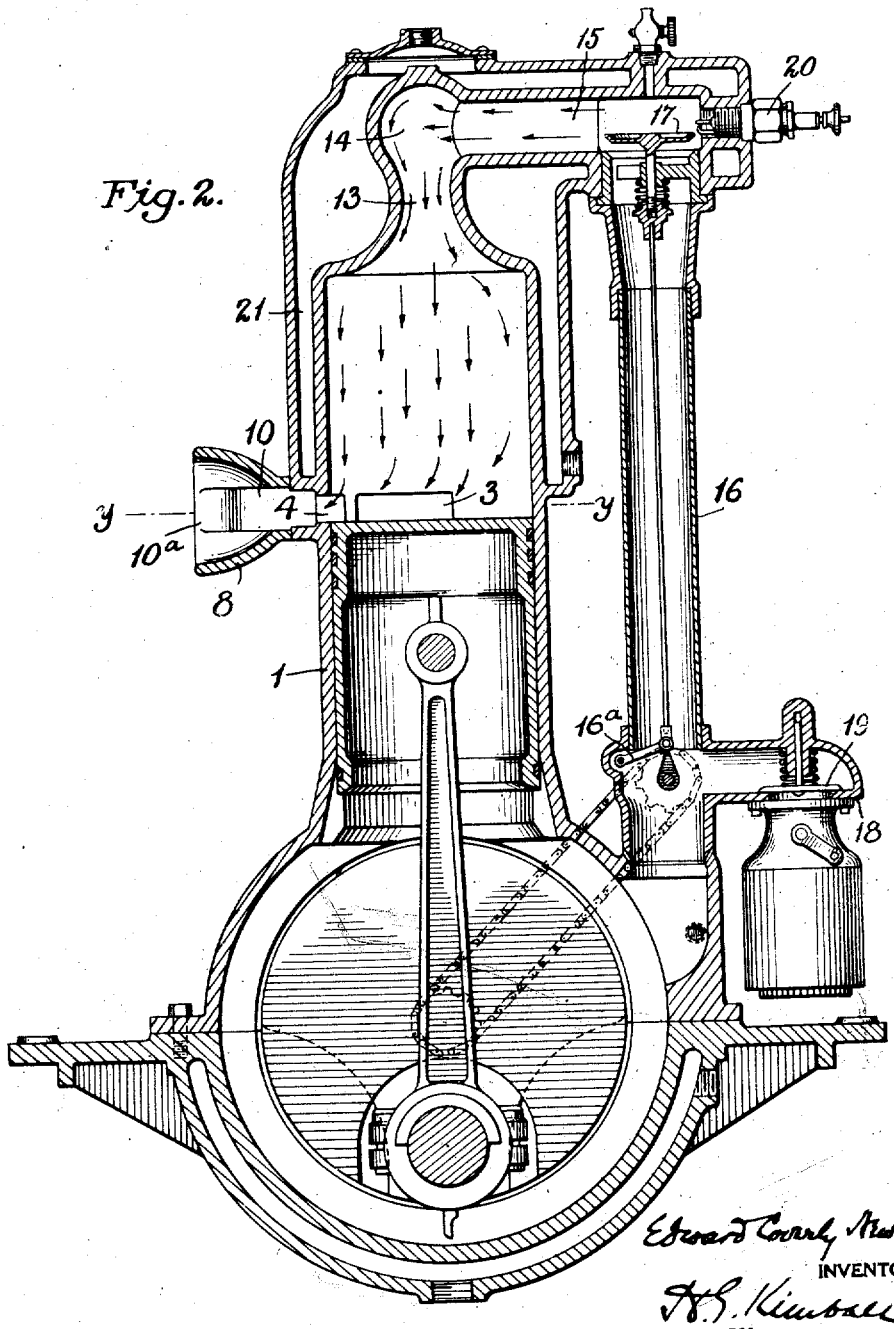

The other objects of my invention will more fully appear in the following specification and claims:

I have illustrated the preferred embodiment of my invention as applied to an engine of the two-cycle type in the accompanying drawings, in which Fig. 1 is a plan view of my invention. Fig. 2 is an elevation of my invention, partly in section. Fig. 3 is a sectional view on the line $y—y$ of Fig. 2.

Similar numerals refer to similar parts throughout the accompanying drawings.

Two cycle motors as heretofore constructed have proved to be undesirable and inefficient except when operated under substantially a full load. When only a partial charge of explosive mixture was admitted, it mingled to such an extent with the burnt gases in the compression chamber that ignition of the mixture was unreliable and when ignited it burned slowly and imperfectly, which resulted in a loss of power and a marked tendency to back fire, which rendered engines of this type unsuitable for use in automobiles and other vehicles and confined the use of two cycle engines mainly to motor boats and stationary engines where their operation was almost constantly under an approximately full load.

In my invention which is illustrated in the accompanying drawings, I have shown an engine of the two cycle type in which the difficulties mentioned have been avoided as well as other difficulties.

In practice I have found that I can run my engine idle with about eight percentum of the maximum charge of the explosive mixture, whereas about one-third of a maximum charge is required for this purpose in two cycle engines as heretofore manufactured while maximum charges are also burned with excellent efficiency.

As shown in the accompanying drawings my invention has been applied to a single cylinder engine of the two cycle type where the crank case is employed for the compression of the explosive mixture in order that it may be forced into the combustion chamber.

As shown in the drawings the casting 1 forms the cylinder walls, water jacket and upper half of the crank case. I provide exhaust ports 3, 4 and 5 in the cylinder wall which are uncovered by the piston in its downward stroke. The casting 8 forms an expansion chamber 10, into which the spent gases are exhausted through the ports 3, 4 and 5, and from which they pass through the orifice $10^a$. The capacity and conformation of the expansion chamber 10 and of the exhaust ports are such that the burnt gases readily and freely pass from all parts of the expansion chamber 10 without mutual interference and the lines of flow of the burnt gases through the exhaust ports and expansion chamber are such that there will be no interference between the several streams, but, on the contrary, the exhaust gases flowing through the central port 4 will be of material aid to the exit of the gases through the ports 3 and 5. If desired, an exhaust pipe of the usual type may be secured to the outlet end of the expansion chamber. The casting 8 is secured in place by studs 12 which pass through lugs $8^a$ cast thereon, and lugs $8^b$ on the casting 1. The compression chamber which is formed in the head of the cylinder and into which all of the gases are compressed at the end of the compression stroke, comprises a passage 13, which is in open communication with a spherical equalizing or rectifying chamber 14 and extending horizontally from the latter, and preferably so positioned with reference thereto that the projected centre line thereof will pass through the centre of said chamber 14, is an ignition chamber 15 which openly discharges into the equalizing chamber 14. This horizontal chamber 15 is of comparatively small cross-sectional area and its total capacity is approximately one-half the capacity of the chambers 13 and 14 and the total capacity of the chambers 13, 14 and 15, which constitute the clearance space or compression chamber, is approximately one-third of the total capacity of the combustion chamber. I prefer to construct the horizontal chamber 15 of approximately the same length as the piston stroke, having found that a chamber of these proportions is adapted to produce the desired results in that it will satisfactorily isolate partial charges of explosive mixture and prevent back firing under all conditions of operation, including minimum and slow burning charges of explosive mixture. I provide a transfer pipe 16 which communicates at its lower end with the crank case in which the explosive mixture is compressed prior to its introduction into the combustion chamber. The throttle valve is located in the carburetor connected to the lower end of the pipe 16 and the upper end of the pipe 16 is in communication with the chamber 15 when the inlet valve 17 is lifted from its seat. I have purposely mounted the valve 17 and the mechanism 16[a] by which it is operated entirely within transfer tube 16 thereby preventing all possibility of air leaks around the stem of the valve which when valves are mounted in accordance with the usual construction cause serious disturbances to the mixture, particularly when the engine is throttled down. The carburetor is secured to the flange 18.

The automatic inlet valve 19 is of the usual type. The firing means 20 is preferably a jump spark plug of the usual type and is mounted at the outer end of the ignition chamber 15 in close proximity to the valve 17. The cylinder is provided with the usual water jacket 21. The other parts are too well known to require description.

In order to obtain the maximum efficiency with an engine of the two-cycle type, it is necessary that there shall be the least possible intermingling of the explosive mixture with the remaining burnt gases; that explosive mixture which is free from burnt gases shall be isolated in proximity to the firing mechanism and that the direction of flame propagation shall be substantially the same as the travel of the incoming mixture in order to insure the burning first of the mixture which is not commingled with the burnt gases in the cylinder and the burning of that portion of the mixture which is more or less intermingled with the burnt gases at a temperature and pressure which is rapidly raised as the mixture is burned.

By my construction the combustion begins at the outer end of the chamber 15, and the flame propagation is through the ignition chamber 15, the equalizing chamber 14, the passage 13 and downward through the cylinder until it is completed, with the result that the mixture in close proximity to the firing plug 20 which is not commingled with the burnt gases remaining in the cylinder, is first ignited, and as the flame is propagated through the ignition chamber 15, the equalizing chamber 14 and the passage 13, the temperature and pressure are rapidly increased as the zone is approached in which the mixture is more or less commingled with burnt gases which insures the effective and rapid combustion thereof. It is also obvious that this construction will result in any gases which may still be burning being isolated so far from the intake valve 17 that all danger of back-firing will be eliminated even when a mechanically operated intake valve 17 is employed, which enables me to eliminate screens and other expedients which have heretofore been necessarily employed to prevent back firing and which seriously interfere with the free flow of mixture into the compression chamber.

The operation of my invention is as follows:

On the upward stroke of the piston the valve 19 is lifted and explosive mixture is drawn from the carbureter down into the tube 16 and into the crank case, if a sufficient charge is admitted. On the return stroke of the piston the explosive mixture in the crank case and tube 16 is compressed and when the exhaust ports have been uncovered by the piston and the pressure in the cylinder has fallen to approximately atmospheric pressure, the valve 17 is lifted and the explosive mixture flows into the outer end of the chamber 15 and passes forward in the direction of the arrows as shown in Fig. 2, into the equalizing chamber 14, where the mixture turns and passes downward into the cylinder, expelling the burnt gases through the ports 3, 4 and 5, without substantially commingling therewith.

It is apparent that when the throttle valve is nearly closed and only a small quantity of explosive mixture is admitted, that the mixture so admitted will practically all remain in the chambers 13, 14 and 15, where it will be isolated and have but little opportunity to mingle with the burnt gases in the expansion chamber and that the mixture in proximity to the firing plug 20 will not be commingled to any substantial extent with any of the burnt gases. It is well known that with engines of the usual type when but a small charge of mixture is introduced the percentage of mixture that mingles with the burnt gases is much larger than when a full charge is introduced and it is, therefore, desirable that when small charges are introduced the mixture should be much richer in fuel than when a full charge is admitted. With my construction I find that substantial enrichment of the mixture when small charges are admitted is not desirable because the commingling of the mixture with the burnt gases is very much reduced and the mixture so commingled is burnt under high compression.

The high efficiency, particularly at higher loads, of the engine above described, I have ascertained is accounted for by the characteristics which are imparted by the coacting passage spaces 14 and 13 to the mixture stream which enters the cylinder. It will be appreciated that the flow velocity of the mixture through the ignition passage 15 may be different at different points in the cross section of that passage and may, for instance, be much different at the top than at the bottom, this being the effect of the admission of the mixture, under pressure, through the poppet inlet valve 17. The impingement of this mixture of non-uniform velocity on the wall at the far side of the space marked 14 and the consequent disturbance and mixing of what may be called the lines of flow promote an equalization of the different velocities besides improving the distribution of suspended liquid fuel particles in the air of the mixture. The flow lines and differing velocities being thus changed or reorganized, direction is given to the mixture charge as a whole by the walls of the passage 13 so that the stream delivered into the cylinder follows the axis of that passage and substantially coincides with the axis of the cylinder and does not strike directly for the exhaust ports. Such a mixture stream, thus mixed and rectified as to direction, is believed to possess, and experimental observations indicate that it does possess, substantially equal velocities on all sides or in all parts of it, so that as it expands into the cylinder the expulsion of the residual gases of the last previous explosion is more thorough than would be the case if the stream velocity were not uniform, that is, if it were m ch faster on one side than the other, and as the case in all prior two-cycle engines of this type of which I am aware. It will be understood that the advantage of this directional control of the entering stream is diminution of the diluting effect which the old gases have on the fresh charge and that it is reflected in the engine performance by a corresponding increase in the power derived from the fuel at higher loads.

The impingement referred to occurs on the curved or concave part of the spherical space 14 which is directly opposite the ignition passage and this surface being concave is therefore inclined, in its major part, both with reference to the general flow direction in the ignition passage and also with reference to the direction of flow into the cylinder, or to the cylinder axis; it may therefore be properly termed an inclined impingement surface, the inclination being with reference to two different axes as stated. The space 14, formed by this impingement surface, and the space 13 together, constitute a directing passage, as by their coaction the laterally directed and non-uniform motion in the ignition passage is overcome and converted into the axially directed and substantially uniform stream delivery into the cylinder. The bulbous enlargement of the space 14 supplements the effect of the inclined impingement surface and improves the reorganizing and uniformizing effect. It produces a slightly restricted outlet or throat through which the mixture passes to the cylinder and when the passage 13 is flared or enlarged toward the cylinder the resulting shape constitutes or resembles a venturi, with the ignition passage opening at a high angle, such as 90°, into its entrance section. The narrow part of the passage 13 is of considerably less diameter than the cylinder and is sufficiently long to give direction to the mixture rebounding or reflected from the impingement surface so that the delivered stream follows the axis of the passage with the effect above stated; it is essential that, for some part of its length at least, the directing passage possess these relative proportions, viz, that it be less than the diameter of the cylinder and long enough to cause the mixture stream to proceed axially into the cylinder, or not toward the exhaust ports, a condition easily realized when the whole of the clearance space is made relatively long and of small cross area as already described.

It is to be understood that my invention as to its broader aspects is not limited to the precise construction herein set forth, as many changes may be made therein without departing from the spirit of my invention and without sacrificing its chief advantages.

I claim:

1. A two cycle internal combustion engine in which the clearance space consists of an ignition chamber of relatively small cross sectional area surrounded by a cooling jacket, inlet and ignition means at the far end thereof, a flow reorganization chamber of substantially greater cross sectional area than said ignition chamber, and into which the ignition chamber discharges, and a Venturi-like discharge outlet from the flow reorganization chamber to the cylinder through a throat of less cross sectional area than the reorganization chamber.

2. A two cycle internal combustion engine in which the clearance space is entirely surrounded by a cooling jacket and of greater length than the piston stroke and the inlet and the ignition means are at the far end thereof, the major portion of the length of said clearance space from the inlet, toward the cylinder, being a relatively small diameter chamber, and a reorganization chamber of substantially greater cross section than said major length chamber into which said small diameter chamber discharges and a discharge outlet leading to the engine cylinder through a throat of less cross section than the reorganization chamber.

3. A two cycle internal combustion engine of the type in which the clearance space is surrounded by a cooling jacket and of much less volume than the cylinder space and of greater length than the piston stroke and the inlet and the ignition means are at the far end thereof, the major portion of the length of said clearance space being a relatively small diameter primary ignition chamber and the minor portion of said length comprising a reorganization chamber of substantially greater cross section than said primary ignition chamber into which the latter discharges, and a Venturi-like expansion portion including a throat of less cross section than the reorganization chamber by which the reorganization chamber discharges into the engine cylinder.

4. An internal combustion engine having a water jacketed clearance space comprising a passage which is long as compared with its diameter, having an inlet and firing device at the remote end thereof and a Venturi-like outlet at the other end thereof, such passage comprising a plurality of portions having approximately straight line axes intersecting at high angle, the portion of the passage at the intersecting angle being formed as a bulbous enlargement for the purposes described and the axis of the Venturi-like discharge throat being substantially coincident with the axis of the cylinder.

5. A two cycle combustion engine in which the clearance space consists of a relatively long water jacketed ignition chamber, the cross sectional area of which is restricted but not beyond the dimensions which will permit a full charge of mixture to enter the cylinder without substantially restricting the flow thereof, an inlet and firing means at the remote end thereof; a flow reorganization chamber of greater cross sectional area than said ignition chamber, and into which the ignition chamber discharges, and a Venturi-like discharge outlet from the flow reorganization chamber to the cylinder through a throat of less cross sectional area than the reorganization chamber.

6. An explosive engine comprising in combination a cylinder, a piston mounted to reciprocate therein, exhaust ports in the cylinder wall adapted to be covered and uncovered by the piston, a clearance chamber comprising an ignition chamber provided with external cooling means, an equalizing chamber and a venturi in open communication between said equalizing chamber and said cylinder, an intake valve located at or near the outer end of said ignition chamber and electrical firing mechanism operating in the ignition chamber and located adjacent to said intake valve.

7. An internal combustion engine comprising in combination a piston, a piston cylinder, exhaust ports in the cylinder wall adapted to be covered and uncovered by the piston, a clearance chamber surrounded by a cooling jacket and consisting of an ignition chamber, the axis of which is not coincident with the axis of the piston cylinder, a flow reorganization chamber into which the ignition chamber discharges, and a Venturi-like port through which said flow reorganization chamber discharges into the piston cylinder, the axis of said port being approximately coincident with the axis of the piston cylinder and the diameter expanded to substantially that of the piston cylinder where it discharges into the piston cylinder, an intake port located adjacent to the outer end of said ignition chamber, and firing mechanism operating adjacent to said intake valve.

8. An internal combustion engine, comprising in combination a piston, a piston cylinder, exhaust ports in the cylinder wall adapted to be covered and uncovered by the piston, a water jacketed clearance chamber, consisting of an ignition chamber, the axis of which is not coincident to the axis of the piston cylinder, a flow reorganization chamber into which the ignition chamber discharges, and a Venturi-like port through which the flow reorganization chamber discharges into the piston cylinder, the conformation of said reorganization chamber and of said port being such that the fresh mixture will advance into the piston cylinder with a substantially even front and velocity, and in a stream having substantially the same cross sectional area as the piston cylinder, means for compressing said mixture outside of the clearance space and means including a mechanically-operated valve for admitting said compressed mixture through an intake port located near the outer end of said ignition chamber.

9. An internal combustion engine comprising in combination a piston, a piston cylinder, exhaust ports in the cylinder wall adapted to be covered and uncovered by the piston, a water jacketed clearance chamber consisting of an ignition chamber, the axis of which is not coincident with the axis of the piston cylinder, a flow reorganization chamber and a Venturi-like port, through which the flow reorganization chamber discharges into the piston cylinder, the conformation of said flow reorganization chamber and said port being such as to cause the fresh mixture to flow into the piston chamber in a stream the cross sectional area of which is substantially equal to the cross sectional area of the piston cylinder, means for compressing said mixture outside of the clearance space and means including a mechanically-operated valve for admitting said compressed mixture through an intake port near the outer end of said ignition chamber.

10. An internal combustion engine comprising in combination a piston, a piston cylinder, exhaust ports in the cylinder wall adapted to be covered and uncovered by the piston, a clearance chamber, consisting of a water jacketed ignition chamber, the axis of which is not coincident with the axis of the piston cylinder, a water jacketed flow reorganization chamber and a Venturi-like port, through which the flow reorganization chamber discharges into the piston cylinder, the conformation of said flow reorganization chamber, and said port being such as to cause the fresh mixture to flow into the piston chamber in a stream the cross sectional area of which is substantially equal to the cross sectional area of the piston cylinder, an intake port near the outer end of said ignition chamber, and firing mechanism operating adjacent to said intake port.

11. An internal combustion engine comprising in combination a piston, a piston cylinder, a carburetor, means for compressing a mixture of fuel and air outside of the combustion space, exhaust ports in the cylinder wall adapted to be covered and uncovered by the piston, an externally cooled clearance chamber, consisting of an ignition chamber, the axis of which is not coincident with the axis of the piston cylinder, a flow reorganization chamber having a Venturi-like discharge port adapted to laterally expand the inflowing mixture from the ignition chamber prior to its entry into the piston cylinder and a mechanically operated valve for admitting said compressed mixture through an intake port adjacent to the outer end of said ignition chamber.

12. An internal combustion engine comprising in combination a piston, a piston cylinder, exhaust ports in the cylinder wall adapted to be covered and uncovered by the piston, a clearance chamber, consisting of a water jacketed ignition chamber, the axis of which is not coincident with the axis of the piston cylinder, a water jacketed flow reorganization chamber having a Venturi-like discharge port adapted to laterally expand the inflowing mixture from the ignition chamber prior to its entry into the piston cylinder, an intake port adjacent to the outer end of said ignition chamber and firing mechanism operating adjacent to said intake port.

13. In a two-cycle engine, the combination of the engine cylinder provided with an exhaust outlet uncovered by the piston and with a clearance space surrounded by a cooling means and constituted by a relatively long, transversely-disposed ignition passage, of small cross-area, communicating at an angle with a directing passage leading to the cylinder, a carburetor, means for admitting charge mixture from the carburetor to the end of said ignition passage most remote from the cylinder, a spark plug adjacent said admission means, the junction of said ignition, and directing passages comprising a surface receiving the impingement of the mixture from said ignition passage, the major part of said impingement surface being inclined with reference to the cylinder axis and cooperating with said directing passage to give the mixture stream into the cylinder a direction coinciding with the direction of the axis of said cylinder.

14. In a two-cycle engine, the combination of the engine cylinder provided with an exhaust outlet uncovered by the piston and with a clearance space surrounded by a cooling means and constituted by a relatively long, transversely disposed ignition passage, of small cross-area, communicating at an angle with a longitudinally-disposed directing passage, the latter for a part of its length being of less diameter than the cylinder and being sufficiently long to cause the mixture stream delivered by it to follow the direction of the axis of said passage, a carburetor, means for admitting variable amounts of mixture therefrom to the end of said ignition passage most remote from the cylinder, a spark plug adjacent said admission means, the junction of said ignition and directing passages comprising a surface receiving the impingement of the mixture from said ignition passage, which surface is inclined to the direction of flow through said ignition passage as well as to the direction of flow through said directing passage and coacts with the latter to give the mixture stream the direction stated.

15. In a two-cycle engine, the combination of the engine cylinder provided with an exhaust outlet uncovered by the piston and with an externally cooled clearance space constituted by a relatively long, transversely disposed ignition passage, of small cross-area, communicating at an angle with a directing passage, the latter for some part of its length being of less diameter than the cylinder, a mechanically operated inlet valve located at the end of said ignition passage most remote from the cylinder, a carburetor and means for supplying variable amounts of fuel mixture therefrom to said valve, the junction of said ignition and directing passages comprising an impingement surface inclined to the directions of the flow through both said pasages, and a spark plug adjacent said inlet valve.

16. In a two-cycle engine, the combination of the engine cylinder provided with an exhaust outlet uncovered by the piston and with an externally cooled clearance space constituted by a relatively long ignition passage of small cross-area, communicating at an angle with a directing passage which latter passage for some part of its length is of less diameter than the cylinder, a carburetor, means for compressing the mixture of fuel and air produced thereby, a mechanically operated inlet valve for admitting variable amounts of such mixture into the end of said ignition passage most remote from the cylinder, the junction of said ignition and directing passages comprising an impingement surface inclined to the directions of flow in both said passages, and a spark plug located in said ignition passage adjacent said inlet valve.

17. In a two-cycle engine, the combination of the engine cylinder provided with an exhaust outlet uncovered by the piston and with an externally cooled clearance space constituted by a relatively long ignition passage, of small cross-area, connecting at an angle with a directing passage which latter passage opens into the cylinder, a carburetor, means for admitting variable charges of fuel mixture from the carburetor to the end of said ignition passage most remote from the cylinder, said directing passage being enlarged at its junction with the ignition passage and having a throat through which the mixture enters the cylinder, and a spark plug situated in said ignition passage at a point reached by the minimum charge admission.

18. In a two-cycle engine, the combination of the engine cylinder provided with an exhaust outlet uncovered by the piston and with an externally cooled clearance space constituted by a relatively long ignition passage of small cross-area connecting at an angle with a directing passage which latter passage opens into the cylinder, the connection between said passages being constituted by a substantially spherical enlargement, a carburetor, means for admitting variable charges of fuel mixture from the carburetor to the end of said ignition passage most remote from the cylinder, and a spark plug situated in said ignition passage at a point reached by the minimum charge admission.

19. In a two-cycle engine, the combination of the engine cylinder provided with an exhaust outlet uncovered by the piston and with a water-jacketed clearance space composed of a relatively long, transversely-disposed, water-jacketed, ignition passage of small cross-area, connecting at an angle with a longitudinally-disposed directing passage which latter passage opens into the cylinder and is for a part of its length of less diameter than the cylinder and of sufficient length to cause the mixture stream delivered by it to follow the direction of the axis of said directing passage, the connection between said passages comprising a bulbous enlargement, a carburetor, a mechanically operated poppet inlet valve located at the end of said ignition passage most remote from the cylinder and adapted to admit fuel mixture thereto from the carburetor, and a spark plug situated in said ignition passage at a point reached by the minimum charge admission.

EDWARD COVERLY NEWCOMB.